No. 893,592. PATENTED JULY 14, 1908.
W. McGOWEN.
HORSEHOOF TRIMMER.
APPLICATION FILED NOV. 7, 1907.
2 SHEETS—SHEET 1.
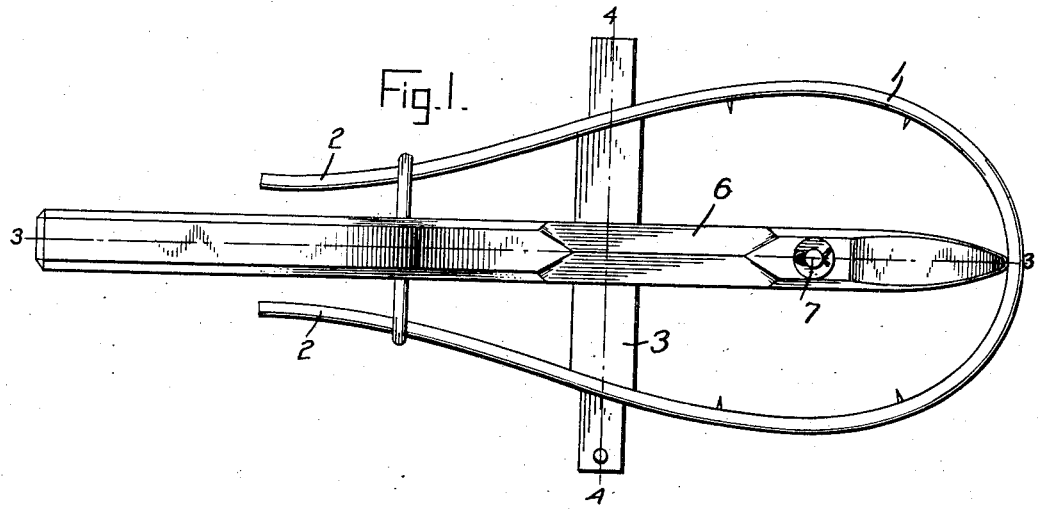
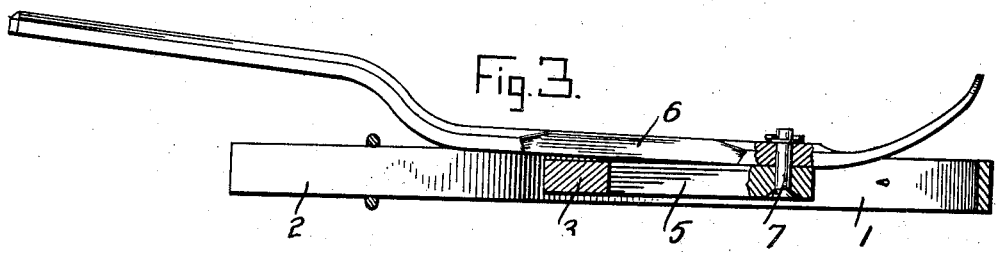
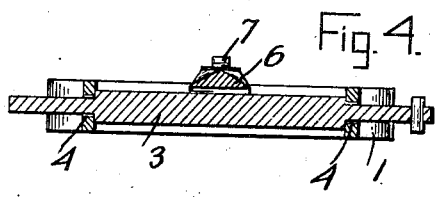
Witnesses
Inventor
W. McGowen

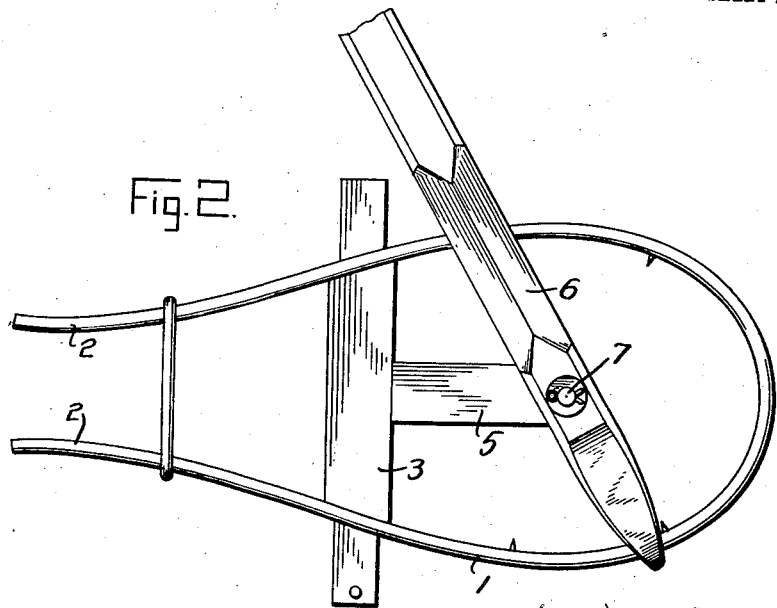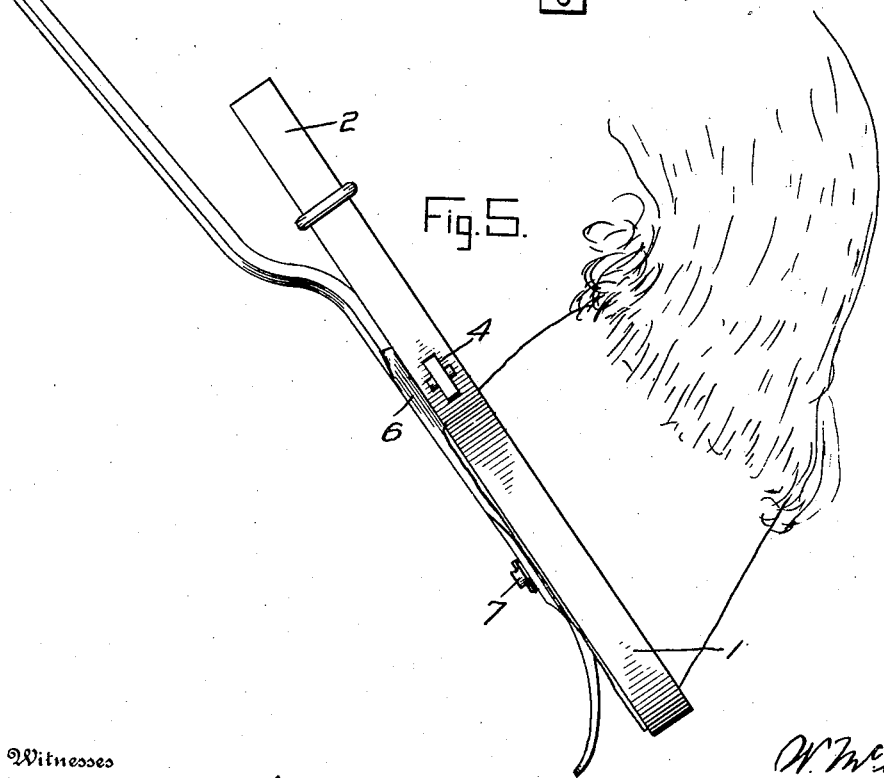

UNITED STATES PATENT OFFICE.

WRIGHT McGOWEN, OF FANSHAWE, OKLAHOMA, ASSIGNOR OF ONE-THIRD TO CHARLES E. GASS AND ONE-THIRD TO J. W. HERRINGTON, BOTH OF FANSHAWE, OKLAHOMA.

HORSEHOOF-TRIMMER.

No. 893,592.

Specification of Letters Patent.

Patented July 14, 1908.

Application filed November 7, 1907. Serial No. 401,177.

*To all whom it may concern:*

Be it known that I, WRIGHT McGOWEN, a citizen of United States, residing at Fanshawe, Oklahoma, have invented certain new and useful Improvements in Horsehoof-Trimmers; and I do hereby declare the following to be a full, clear, and exact description of the invention, such as will enable others skilled in the art to which it appertains to make and use the same.

This invention has relation to devices for trimming the hoofs of horses preparatory to shoeing the same; and it is the object of the invention to provide improvements whereby the trimming device may be held more securely on the hoof and the knife supported and operated with the utmost advantage.

The drawings hereto annexed and forming a part of this specification illustrate in—Figure 1 a plan of the invention. Fig. 2 a like view showing the knife in a different position. Fig. 3 a section on the line 3 3 of Fig. 1. Fig. 4 is a transverse section on the line 4 4 of Fig. 1. Fig. 5 is a side elevation.

Similar characters of reference designate similar parts or features, as the case may be, wherever they occur.

In the drawings 1 designates the hoof clamp which is composed of a bowed strip of resilient steel or similar substance, shaped in general to fit the outside lower margin of the hoof of a horse or mule. The ends 2, of the clamp-strip are extended convergently to form a handle, when they are brought nearly together to clamp the strip on the hoof. The said ends are also provided with a keeper which may be slipped up thereon so as to maintain the clamp on the hoof automatically.

The clamp strip is provided with a transverse bar 3, the ends of which are tenoned and projected through slots 4 in the sides of the clamp at the base of the heel forming a shoulder at the inner ends of said tenons, so that a limit is formed to the extent of which the clamp may be pinched around the hoof. From the tenon into said cross-piece 3 is a piece 5 extending from the cross-piece forwardly to near the middle of the hoof on the end of which forwardly projecting piece 5 a knife 6 is pivoted by means of a bolt secured in the piece 5, said bolt projecting from the hole in the knife and secured in place by a cotter pin 7. This affords a means for swinging the knife around from the extremest points to which it may be desired to operate it. The handle of the knife is turned upward at the outer end so as to facilitate the manner of taking hold of it and operating it without danger of injuring the fingers. The forward end of the knife is curved upwardly and pointed as shown so as to afford means by which the hoof may be cleaned preparatory to having the clamp placed thereon and the hoof trimmed. The knife is two-edged, as shown, so that the trimming of the hoof can be effected from the rear or the front.

In case of necessity of grinding the knife it can be easily removed by taking out the cotter pin 7 in the plate 6 and after the knife shall have been sharpened it can be replaced instantly.

By providing a steel spring clamp as stated, formed in one piece the hoof can be grasped quite tightly by squeezing the ends of the clamp together and be held and moved about by one hand holding on to said ends and the other left free to operate the knife as may be desired.

It is recognized that it is common in the art to employ clamps and knives operating upon a pivot placed on some means connected with the clamp, the clamp itself being composed of iron or other means less efficient than the resilient strip of steel shown for the purpose for which it is provided.

What is claimed is—

1. A hooftrimmer composed of a strip of resilient steel bent into bowed form approaching the shape of the outside lower margin of the hoof of a horse, the ends of the bowed strip being extended and bent inward convergently to form a handle whereby the squeezing together of the extended ends may tighten the clamp on the hoof, slots formed in the sides of the clamp near the heel, a cross-bar provided at its ends with tenons extended through said slots, a bar tenoned at its rear end in said cross-bar and extended forward therefrom, and a knife pivoted on the inner end of the said latter bar.

2. A hooftrimmer comprising a clamp composed of a single strip of resilient steel bent to a form approaching the shape of the outside lower margin of the hoof and having extended ends that may be squeezed together by the hand, a knife having an outwardly bent handle and an extended forward end also bent outwardly, and means connected with the clamp upon which the knife and its handle are pivoted.

In testimony whereof, I affix my signature, in presence of two witnesses.

WRIGHT McGOWEN.

Witnesses:
C. E. GASS,
JAMES HERINGTON.